United States Patent [19]

Tani

[11] Patent Number: 5,631,705
[45] Date of Patent: May 20, 1997

[54] VIDEO CAMERA HAVING CIRCUIT FOR SETTING EXPOSURE COMPENSATION VALUE

[75] Inventor: Nobuhiro Tani, Tokyo, Japan

[73] Assignee: Asahi Kogaku Kogyo Kabushiki Kaisha, Tokyo, Japan

[21] Appl. No.: 690,999

[22] Filed: Aug. 1, 1996

Related U.S. Application Data

[63] Continuation of Ser. No. 517,452, Aug. 15, 1995, abandoned, which is a continuation of Ser. No. 105,054, Aug. 12, 1993, abandoned.

[30] Foreign Application Priority Data

Aug. 13, 1992 [JP] Japan ..................... 4-236312

[51] Int. Cl.$^6$ ............................................. H04N 5/335
[52] U.S. Cl. .................... 348/314; 348/228; 348/366
[58] Field of Search ....................... 348/221, 299, 348/314, 366, 228, 229, 230; H04N 3/14, 5/335

[56] References Cited

U.S. PATENT DOCUMENTS

| | | | |
|---|---|---|---|
| 3,896,485 | 7/1975 | Early | 348/314 |
| 4,369,469 | 1/1983 | Endo et al. | 348/314 |
| 4,963,980 | 10/1990 | Suga et al. | 348/314 |
| 4,963,983 | 10/1990 | Kohno et al. | 348/314 |
| 5,095,226 | 3/1992 | Tani | 348/294 |
| 5,299,015 | 3/1994 | Imaide et al. | 348/229 |

OTHER PUBLICATIONS

Japanese Article entitled "CCD–Camera Technology" with partial English translation. 1986 (No Month).

*Primary Examiner*—Michael Horabik
*Assistant Examiner*—Michael Day
*Attorney, Agent, or Firm*—Greenblum & Bernstein P.L.C.

[57] ABSTRACT

In a device for controlling an imaging device, a voltage $\phi V_{SUB}$ which is applied to a substrate of a CCD is changed in accordance with an exposure compensation value. Switches are turned ON or OFF in accordance with the exposure compensation value, and an MPU 15 accordingly controls a substrate voltage control circuit. When the exposure compensation value has a positive value, the substrate voltage $\phi V_{SUB}$ is set to a high value, so that the saturation level of the CCD becomes low; thus, an overflown surplus electric charge caused by a large amount of incident light is easily absorbed by a depletion layer of the CCD. When the exposure compensation value has a negative value, the substrate voltage $\phi V_{SUB}$ is set to a low value. As a result, the saturation level of the CCD becomes high, and thus the dynamic range for sensing image luminances of varying levels is increased.

17 Claims, 5 Drawing Sheets

| EXPOSURE ADJUSTMENT | S1 | S2 | | P1 | P2 |
|---|---|---|---|---|---|
| +1 EV | L | H | | L | H |
| -1 EV | H | L | | L | L |
| WITHOUT ADJUSTMENT | H | H | | H | |

VIDEO CAMERA HAVING CIRCUIT FOR SETTING EXPOSURE COMPENSATION VALUE

This application is a continuation of application Ser. No. 08/517,452, filed Aug. 15, 1995, now abandoned, which is a continuation of application number 08/105,054, filed Aug. 12, 1993, now abandoned.

BACKGROUND OF THE INVENTION

1. Field of the Invention

The present invention relates to a still video device, and more particularly relates to a device for controlling a still video device in order to eliminate or reduce the effect of blooming in a still image produced by a still video device.

2. Description of the Related Art

In a conventional still video device, electrical image signals corresponding to an object are formed by a charge-coupled device (CCD), processed, and are then recorded as a still image on a recording medium such as a memory card. Each signal formed by the CCD has a value corresponding to the luminance of a portion of the object. When the object includes a high luminance portion, smearing may occur extending in upward or downward directions from the resulting high luminance portion of the image. Accordingly, in order to prevent such smearing from occurring, residual electrical charges existing on a vertical transfer CCD are discharged through a horizontal transfer CCD to the outside of the device, by a so-called high speed discharge operation.

Some conventional still video cameras have a mechanism for adjusting an exposure value in accordance with the luminance of an object. Namely, when the object is photographed under a rear light condition, for example, by a photographer, an exposure compensation value (exposure adjustment value) having a positive value is added to an exposure value that was obtained by photometry, so that a distinct object image can be obtained.

As described above, when a high luminance portion exists in an image frame, the smear generated on the frame can be removed. However, when an exposure compensation value having a positive value is added, the high luminance portion acquires an effectively higher luminance. Therefore, electric charges that are overflowing from the high luminance portion enter upper and lower portions thereof (i.e., move along the electric charge transfer direction in the vertical transfer CCD). As a result, blooming occurs which comprises bright stripes that extend in upward and downward directions from the high luminance portion, thereby deteriorating the image quality.

SUMMARY OF THE INVENTION

Therefore, it is an object of the present invention to provide a device for controlling an imaging device, by which blooming is prevented from occurring when a positive exposure compensation value is added to an exposure value obtained by photometry.

In accordance with a particular aspect of the present invention, a device is provided for controlling an imaging device mounted in a still video camera. The device comprises a setting mechanism and a control mechanism. The setting mechanism sets an exposure compensation value. The control mechanism controls a substrate voltage of the imaging device in accordance with the exposure compensation value.

In accordance with a further aspect of the present invention, a device is provided for controlling an imaging device mounted in a still video camera, the device comprising a voltage applying mechanism, a setting mechanism and a control mechanism. The voltage applying mechanism applies a voltage to a substrate of the imaging device. The setting mechanism allows setting of an exposure compensation value. The control mechanism controls the voltage applying mechanism to apply the voltage in accordance with the exposure compensation value.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
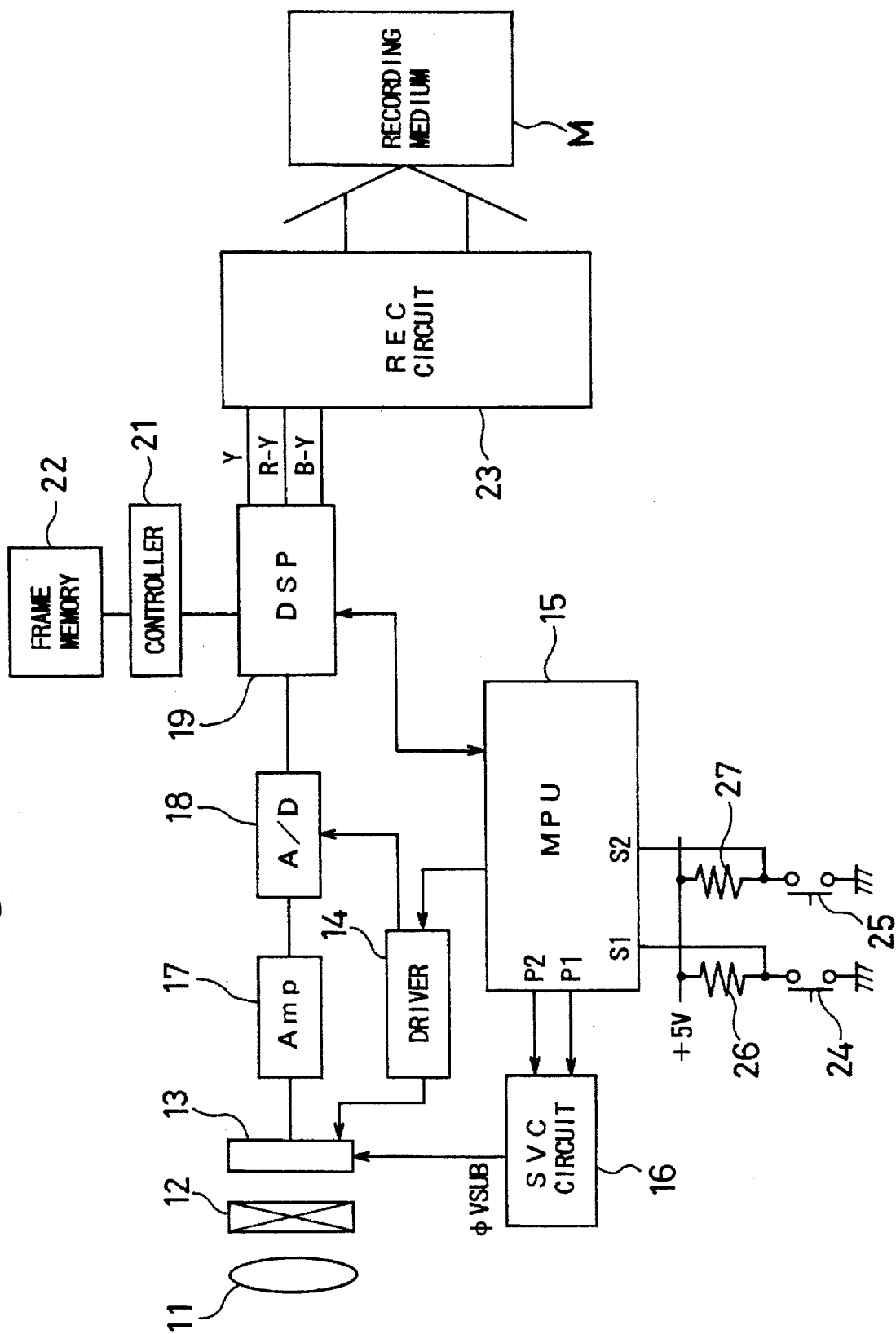
FIG. 1 is a block diagram showing a circuit of a still video device to which an embodiment of the present invention is applied.

The present invention will now be described with reference to several embodiments as shown in the drawings.

FIG. 1 is a block diagram showing a recording system of a still video device to which an embodiment of the present invention may be applied. A beam passes through a lens 11 and a shutter 12 which functions also as an aperture, and reaches a CCD 13, which is driven by pulse signals outputted from a driver 14, to output a luminance signal and color signals. Driver 14 is controlled by a control circuit (MPU) 15 to output clock pulses at a constant rate. A substrate voltage control circuit 16 is provided for changing a substrate voltage of CCD 13 in accordance with an exposure adjustment value, and is controlled by MPU 15, as described further below.

The output signal of CCD 13 is amplified by an amplifier 17, and is converted to a digital signal by an A/D converter 18 to be input into a digital signal processing circuit 19. A/D converter 18 may be driven by clock pulses that are output from a driver 14, to carry out A/D conversion in time with a transferring operation performed on electric charges in CCD 13.

Digital signal processing circuit 19 is operated under control of MPU 15. Digital signal processing circuit 19 carries out a predetermined process, such as adding a synchronizing signal to a luminance signal and color signals output from A/D converter 18, to form a luminance signal (Y) and differential color signals (R-Y, B-Y). The luminance signal (Y) and differential color signals (R-Y, B-Y) are stored in a frame memory 22 through a memory controller 21, and are also forwarded to a record control circuit 23 to be subjected to a predetermined process, and to then be recorded in a recording medium M such as a memory card. A frame memory 22 may be provided for storing an image signal corresponding to a still image recorded in recording medium M, so that the still image can be observed through a display device (not shown), by reading of the image signal stored in frame memory M.

A first switch 24 and a second switch 25, connected to MPU 15, are turned ON and OFF in accordance with an exposure compensation value (exposure adjustment value) that may be set by a photographer. Pull-up resistors 26 and 27 are provided between a power supply (+5 V) and switches 24 and 25, respectively. By operation of switches 24 and 25, command signals necessary for controlling the substrate voltage control circuit 16 are output from MPU 15.

Figure 2:
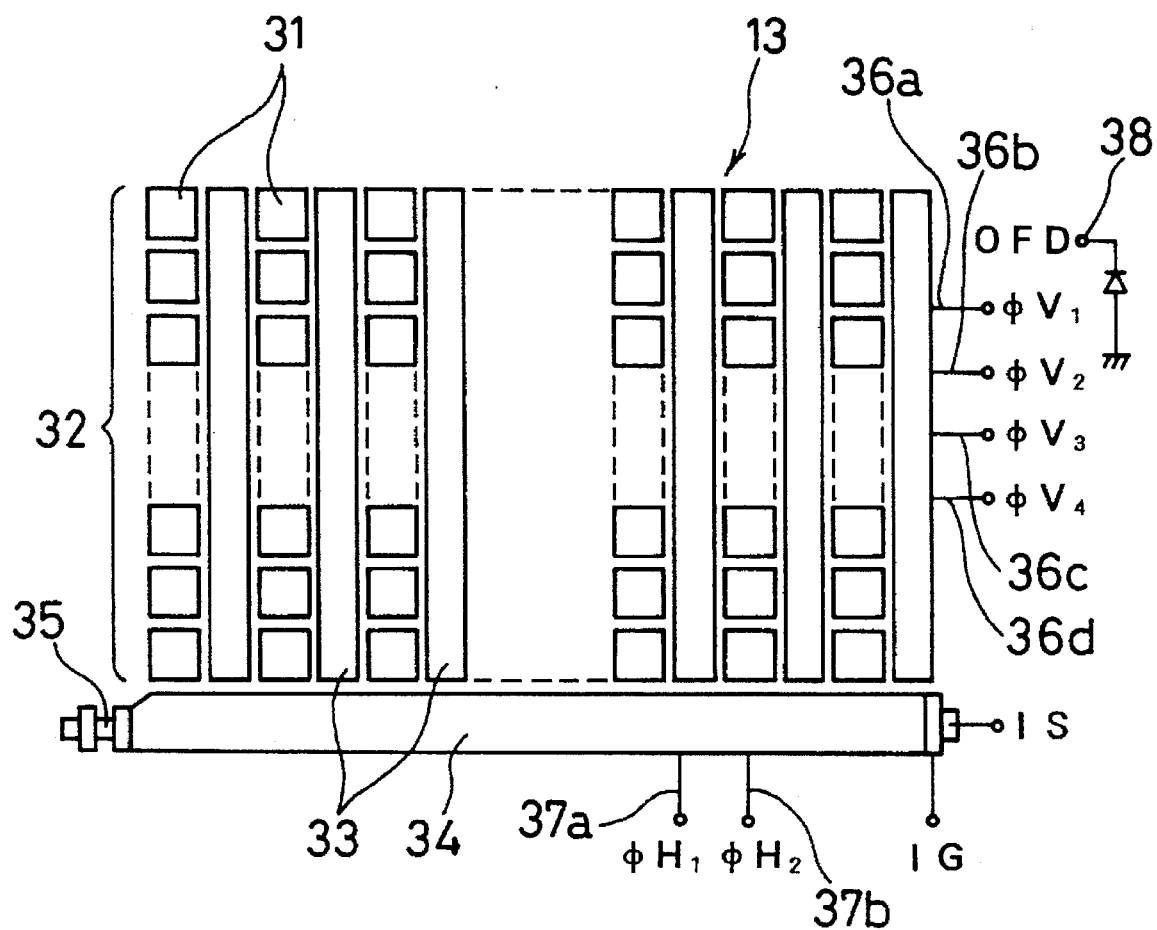
FIG. 2 is a diagram showing arrangements of several elements of a CCD.

FIG. 2 shows a construction of a CCD 13. Photodiodes 31 are provided which correspond to each pixel, and a light receiving portion 32 is formed in an area within which photodiodes 31 are disposed. A signal electric charge is formed on photodiodes 31 in accordance with an amount of light entering the same. A vertical transfer CCD 33 is provided adjacent to each linear array of photodiodes 31, and extends in a vertical direction. Vertical transfer CCDs 33 transfer an electric charge generated at their adjacent photodiodes 31 to a horizontal transfer CCD 34. A floating diffusion amplifier (FDA) 35 is connected to horizontal transfer CCD 34, and changes an electric charge transferred from horizontal transfer CCD 34 to a voltage, and outputs the voltage to a location outside of CCD 13.

CCD 13 is controlled by a drive signal that is output from a driver 14. Namely, in the vertical transfer CCD 33, an electric charge is transferred in accordance with 4-phase drive signals $\phi V_1$ through $\phi V_4$ supplied through terminals 36a through 36d. In the horizontal transfer CCD 34, an electric charge is transferred in accordance with the drive signals $\phi H_1$ and $\phi H_2$ supplied from terminals 37a and 37b.

An overflow drain (OFD) 38 is provided for applying a substrate voltage to CCD 13. In this embodiment, the substrate voltage can be changed by substrate voltage control circuit 16 (FIG. 1) in accordance with an exposure adjustment value.

Figure 3:
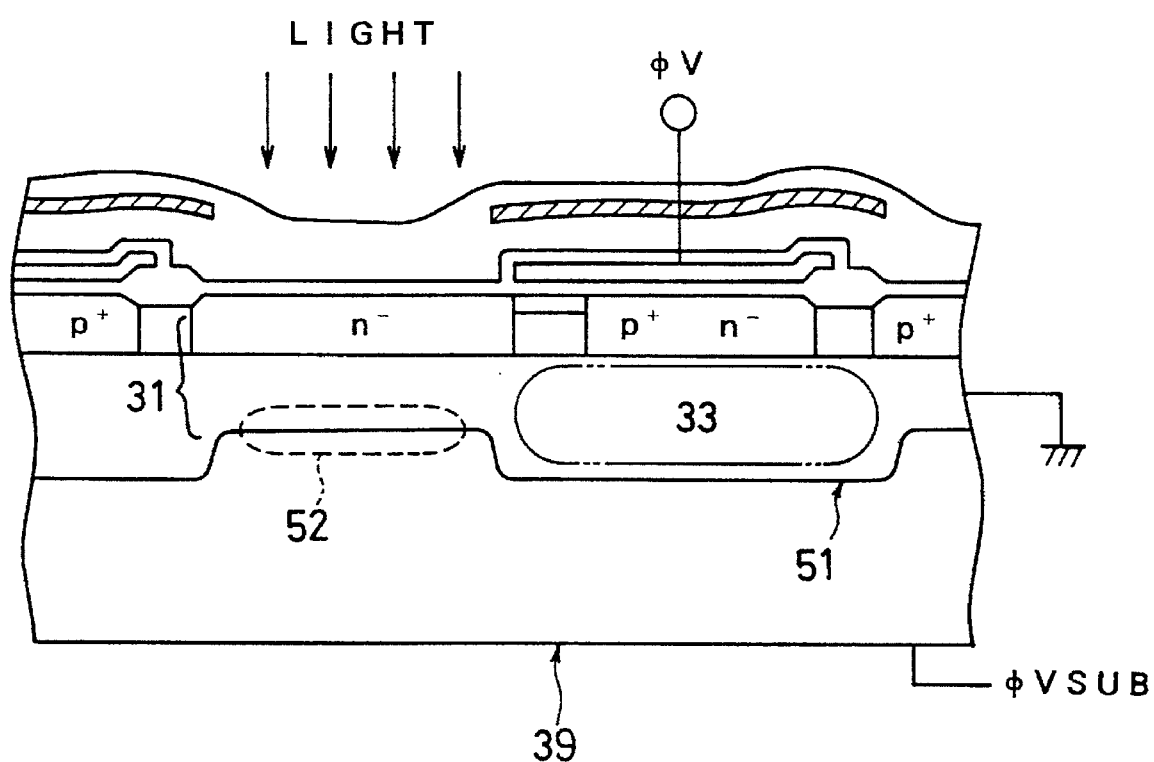
FIG. 3 is a sectional view in which a part of a CCD is enlarged.

FIG. 3 shows a sectional view in which a part of CCD 13 is enlarged. An electric charge corresponding to an amount of light received is accumulated on photodiode 31, and the electric charge is transferred through vertical transfer CCD 33 in a direction perpendicular to the plane of the drawing. A substrate voltage $\phi V_{SUB}$ is applied to substrate 39, which is an n-layer, by the substrate voltage control circuit 16 (FIG. 1). A p-layer 51 is electrically grounded. Therefore, a reverse bias voltage is applied to substrate 39 and p-layer 51, so that a depletion layer 52 is formed between photodiode 31 and substrate 39. Surplus electric charges that overflow from photodiode 31, due to an excess amount of received light, are absorbed in depletion layer 52.

Figure 4:
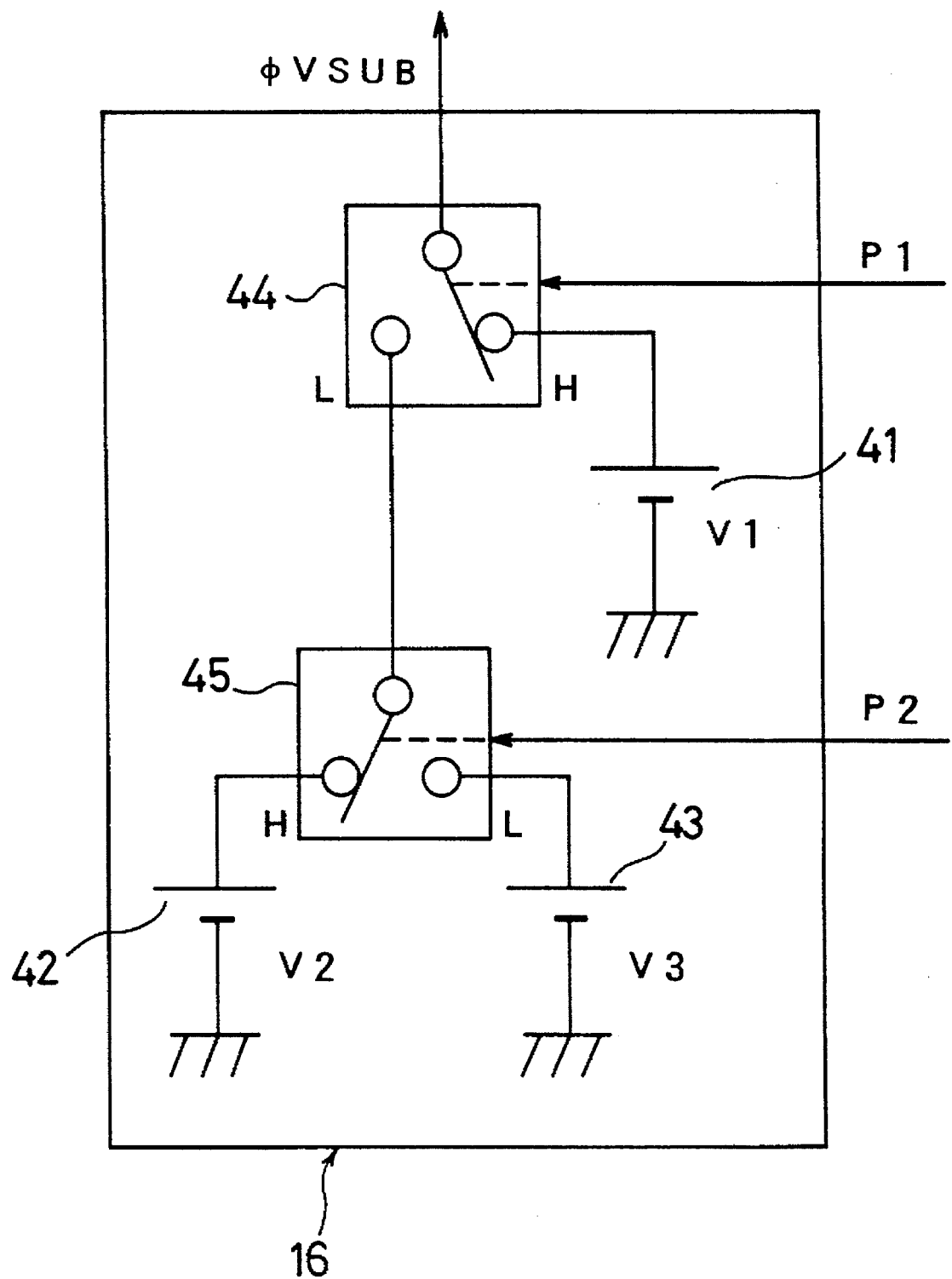
FIG. 4 is a circuit diagram showing a substrate voltage control circuit.

FIG. 4 shows a construction of a substrate voltage control circuit 16. Control circuit 16 is illustrated and contains first, second and third power supplies 41, 42 and 43, and first and second switches 44 and 45. A voltage V3 is generated by a third power supply 43 and is the lowest voltage value, and a voltage V2 is generated by the second power supply 42 and is the highest voltage value. A voltage V is generated by first power supply 41, and has a value that is between the values of voltages V2 and V3.

First and second switches 44 and 45 are switched by control voltages output from terminals P1 and P2 of MPU 15. When the control voltage output from terminal P1 has a high level "H," first switch 44 connects first power supply 41 to substrate 39 of CCD 13 to supply voltage V1 to CCD 13 as the substrate voltage $\phi V_{SUB}$. Conversely, when the control voltage output from terminal P1 has a low level "L," first switch 44 is switched to second switch 45. In this case, when the control voltage output from terminal P2 has a high level "H," second switch 45 connects second power supply 42 to substrate 39 to supply voltage V2 to CCD 13 as substrate voltage $\phi V_{SUB}$. When the control voltage output from terminal P2 has a low level "L," second switch 45 connects third power supply 43 to substrate 39 to supply voltage V3 to CCD 13 as substrate voltage $\phi V_{SUB}$. The operation of this embodiment described above will now be described with respect to FIGS. 4, 5 and 6.

Figures 5, 6:
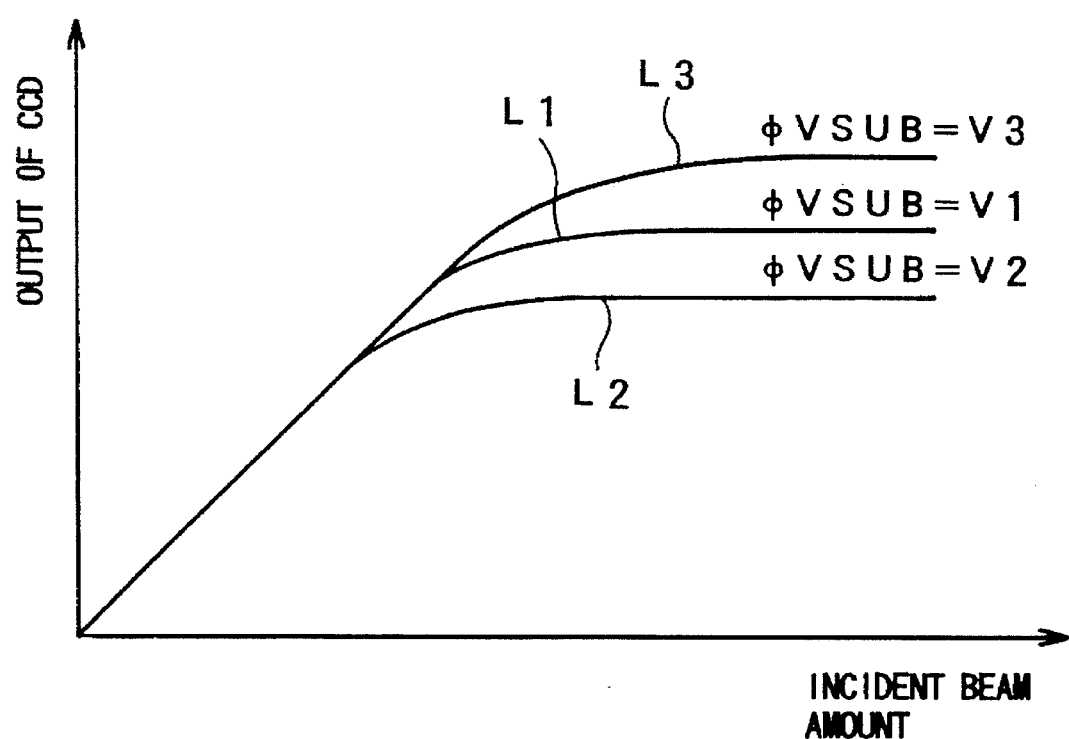
FIG. 5 is a diagram showing a relationship between an exposure adjustment value and a voltage at a terminal of an MPU.
FIG. 6 is a diagram which illustrates the relationship between an amount of light entering the CCD and an output level of the CCD.

When an exposure compensation value of a still video device has not been set by an operator or photographer, which means that the exposure compensation value is zero, first and second switches 24 and 25 (FIG. 1) are set to an OFF state. Therefore, the voltage of the power supply applied to input terminals S1 and S2 of MPU 15 through resistors 26 and 27, respectively, and the voltages of terminals S1 and S2 are high "H." Accordingly, the voltage of output terminal P1 of MPU 15 is "H," as shown in FIG. 5.

As a result, in substrate voltage control circuit 16 (as shown in FIG. 4), first switch 44 is switched to the side of first power supply 41, so voltage V1 having a mid-value is applied to substrate 39 of CCD 13 as the substrate voltage $\phi V_{SUB}$. With this setting, the output level of CCD 13 is linearly increased with an increase in the amount of light entering into CCD 13, and it becomes saturated at a predetermined level (i.e., reaches a constant value), as shown by the solid line L1 in FIG. 6.

When the exposure compensation value is positive, e.g., when an exposure compensation value of +1 EV (exposure voltage) is set, first switch 24 is turned ON and second switch 25 is turned OFF. Therefore, the voltage of the power supply is applied only to input terminal S2 through resistor 27, and terminal S1 is electrically grounded. The resulting voltage of terminal S is low "L," and the voltage of terminal S2 is high "H," as shown in FIG. 5.

In substrate voltage control circuit 16, first switch 44 is switched to the side of second switch 45, which is switched to the side of second power supply 42. Therefore, voltage V2, having a relatively high value, is applied to substrate 39 of CCD 13 as the substrate voltage $\phi V_{SUB}$. Thus, since the substrate voltage $\phi V_{SUB}$ is set to a high value, depletion layer 52 becomes large so that electric charges generated in the photodiodes 31 are easily absorbed in depletion layer 52. Namely, the saturation level of the output level of CCD 13 becomes low as shown by solid line L2 in FIG. 6. Electric charges that overflow from photodiodes 31 (due to a large incident light beam) are fully absorbed into depletion layer 52. Therefore, blooming may be reduced or eliminated even when photographing an object having high luminance.

When the exposure compensation value is negative, e.g., −1 EV, first switch 24 is turned OFF and second switch 25 is turned ON. Therefore, the voltage of the power supply is applied only to input terminal S1 through resistor 26, and terminal S2 is electrically grounded. Accordingly, the voltage of terminal S1 is "H" and the voltage of terminal S2 is "L," as shown in FIG. 5.

In substrate voltage control circuit 16, first switch 44 is switched to the side of second switch 45, which is switched to the side of third power supply 43. Therefore, voltage V3, having a relatively low value, is applied to substrate 39 of CCD 13 as the substrate voltage $\phi V_{SUB}$. Thus, since the substrate voltage $\phi V_{SUB}$ is set to a low value, depletion layer 52 becomes small. As a result, the saturation level of the output level of CCD 13 becomes high as shown by the solid line L3 in FIG. 6. Thus, the resolution of a formed image of an object having a low luminance becomes high. Namely, the dynamic range over which a high luminance image is sensed is increased.

In the above-described embodiment, the substrate voltage $\phi V_{SUB}$ is changed with three steps in accordance with three different exposure compensation values. The number of steps of changing the substrate voltage may be increased without substantially departing from the spirit of the present invention.

Although the embodiments of the present invention as described herein are described with reference to particular drawings, many modifications and changes may be made to the embodiments disclosed herein by those skilled in the art without departing from the scope of the present invention.

I claim:

1. A device for controlling an imaging device mounted in a still video camera, the camera obtaining an exposure value by photometry, said device comprising:

setting means for setting an exposure compensation value, from at least three exposure compensation values, for modifying the obtained exposure value, said exposure compensation value being independent of said exposure value obtained by photometry and being set by a user of said still video camera;

control means for controlling a substrate voltage of a substrate of said imaging device in accordance with said exposure compensation value; and exposure controlling means for controlling a shutter of said imaging device in accordance with said exposure value obtained by photometry.

2. A device according to claim 1, wherein said control means controls said substrate voltage to have a first value when said exposure compensation value is zero.

3. A device according to claim 2, wherein said control means controls said substrate voltage to have a second value when said exposure compensation value is positive, and controls said substrate voltage to have a third value when said exposure compensation value is negative, said second value being higher than said first value, and said third value being lower than said first value.

4. A device according to claim 2, wherein said control means comprises a control circuit, said control circuit having a first power supply for generating a voltage corresponding to said first value, and a first switch for connecting said first power supply to said substrate of said imaging device when said exposure compensation value is zero.

5. A device according to claim 4, wherein said control means comprises a control circuit, said control circuit having a second power supply for generating a voltage corresponding to said second value, a third power supply for generating a voltage corresponding to said third value, a second switch for connecting said second power supply to said substrate when said exposure compensation value is positive, and a third switch for connecting said third power supply to said substrate when said exposure compensation value is negative.

6. A device according to claim 1, wherein said substrate of said imaging device comprises means for supporting a plurality of photodiodes and a plurality of vertical transfer charge coupled devices.

7. A device according to claim 1, further comprising a mechanism, operable by a photographer, for setting a predetermined exposure compensation value coupled to said setting means for allowing a still video camera operator to set said exposure compensation value to one of a plurality of selectable values.

8. A device according to claim 1, control of said substrate voltage by said control means comprising means for expanding a dynamic range of said imaging device.

9. The device of claim 1, wherein said at least three exposure compensation values comprise a positive value, a negative value and a value of zero.

10. A device for controlling an imaging device mounted in a still video camera, the camera obtaining an exposure value by photometry, said device comprising:

applying means for applying a voltage to a substrate of said imaging device;

setting means for setting an exposure compensation value, from among at least three exposure compensation values, for modifying the obtained exposure value, said exposure compensation value being independent of said exposure value obtained by photometry and being set by a user of said still video camera;

control means for controlling said applying means to apply said voltage in accordance with said exposure compensation value; and exposure control means for controlling a shutter of said imaging device in accordance with said exposure value obtained by photometry.

11. A device according to claim 10, wherein said substrate of said imaging device comprises means for supporting a plurality of photodiodes and a plurality of vertical transfer charge coupled devices.

12. A device according to claim 10, further comprising a mechanism, operable by a photographer, for setting a predetermined exposure compensation value coupled to said setting means for allowing a still video camera operator to set said exposure compensation value to one of a plurality of selectable values.

13. A device according to claim 10, control of said substrate voltage by said control means comprising means for expanding a dynamic range of said imaging device.

14. The device of claim 10, wherein said at least three exposure compensation values comprise a positive value, a negative value and a value of zero.

15. A controlling device for an imaging device that obtains an exposure value by photometry, the imaging device being associated with a camera, said controlling device comprising:

a manually operable exposure compensator that sets an exposure compensation value from at least three exposure compensation values, said exposure compensation value being used to modify said exposure value obtained by photometry, said exposure compensation value being distinct from said exposure value obtained by photometry;

a substrate voltage controller that controls a voltage of a substrate of the imaging device in accordance with said exposure compensation value; and an exposure controller that controls a shutter of the imaging device in accordance with said exposure value obtained by photometry.

16. The controlling device of claim 15, wherein said substrate voltage controller expands a dynamic range of the imaging device.

17. The controlling device of claim 15, wherein said at least three exposure compensation values comprise a positive value, a negative value and a value of zero.

* * * * *